United States Patent
Khovaylo (10) Patent No.: US 7,051,942 B2
(45) Date of Patent: May 30, 2006

(54) OPTICAL SCANNER ASSEMBLY AND RELATED METHODOLOGY

(75) Inventor: Modest Khovaylo, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/819,805

(22) Filed: Apr. 6, 2004

(65) Prior Publication Data

US 2004/0262397 A1 Dec. 30, 2004

Related U.S. Application Data

(60) Provisional application No. 60/461,273, filed on Apr. 7, 2003.

(51) Int. Cl.
*G06K 7/10* (2006.01)

(52) U.S. Cl. .......................... 235/462.43; 235/462.01; 235/472.01

(58) Field of Classification Search ............................. 235/462.01–462.47, 472.01, 472.02, 472.03, 235/454, 455, 494, 470, 490
See application file for complete search history.

(56) References Cited

U.S. PATENT DOCUMENTS

| | | | | |
|---|---|---|---|---|
| 5,325,217 A | * | 6/1994 | Nagler et al. | 358/506 |
| 5,414,481 A | * | 5/1995 | Fujioka et al. | 353/122 |
| 5,491,557 A | * | 2/1996 | Nakajima et al. | 358/296 |
| 5,646,746 A | * | 7/1997 | Tazawa et al. | 358/471 |
| 5,754,713 A | | 5/1998 | Deguchi et al. | |
| 5,981,943 A | | 11/1999 | Berg et al. | |
| 6,040,572 A | | 3/2000 | Khovaylo et al. | |
| 6,233,064 B1 | | 5/2001 | Griffin | |
| 6,750,442 B1 | * | 6/2004 | Bala et al. | 250/226 |

* cited by examiner

*Primary Examiner*—Thien M. Le (57) ABSTRACT

An optical scanner may be used either with or without a support stand. When operated without the support stand, the scanner may be used to acquire an image of an object in virtually any location and/or orientation, e.g., an image of a picture hanging on a wall. When used in conjunction with the support stand, the support stand may hold the scanner in a non-horizontal orientation so that the combined scanner and support stand occupy a relatively smaller footprint. The scanner may attach to the support stand such that it is able to pivot with respect to the support stand. An object to be scanned (e.g., a document) may then be placed on a support surface of the support stand and the scanner pivoted to a closed position to allow scanning of the object. In this manner, the scanner may also be used in a manner similar to a conventional flatbed scanner.

18 Claims, 12 Drawing Sheets

OPTICAL SCANNER ASSEMBLY AND RELATED METHODOLOGY

This application claims the benefit of U.S. Provisional Application No. 60/461,273, filed Apr. 7, 2003, for OPTICAL SCANNER ASSEMBLY of Modest Khovaylo which is hereby incorporated by reference for all that is disclosed therein.

U.S. Provisional Application No. 60/461,261, filed Apr. 7, 2003, for OPTICAL SCANNER ASSEMBLY of Modest Khovaylo and U.S. patent application Ser. No. 10/820,086, filed Apr. 6, 2004, for OPTICAL SCANNER ASSEMBLY of Modest Khovaylo et al. are hereby incorporated by reference for all that is disclosed therein.

BACKGROUND

Scanner devices, such as flatbed scanners, are well-known in the art and produce machine-readable image data signals that are representative of a scanned object, such as a photograph or a page of printed text. In a typical scanner application, the image data signals produced by a scanner may be used by a personal computer to reproduce an image of the scanned object on a suitable display device, such as a CRT or a printer. A typical flatbed scanner may include illumination and optical systems to accomplish scanning of the object. The illumination system illuminates a portion of the object (commonly referred to as a "scan region"), whereas the optical system collects light reflected by the illuminated scan and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the illumination and optical systems with respect to the object.

SUMMARY

An optical scanner may be used either with or without a support stand. When operated without the support stand, the scanner may be used to acquire an image of an object in virtually any location and/or orientation, e.g., an image of a picture hanging on a wall.

When used in conjunction with the support stand, the support stand may hold the scanner in a non-horizontal orientation so that the combined scanner and support stand occupy a relatively smaller footprint. The scanner may attach to the support stand such that it is able to pivot with respect to the support stand. An object to be scanned (e.g., a document) may then be placed on a support surface of the support stand and the scanner pivoted to a closed position to allow scanning of the object. In this manner, the scanner may also be used in a manner similar to a conventional flatbed scanner.

DETAILED DESCRIPTION

Figure 1:
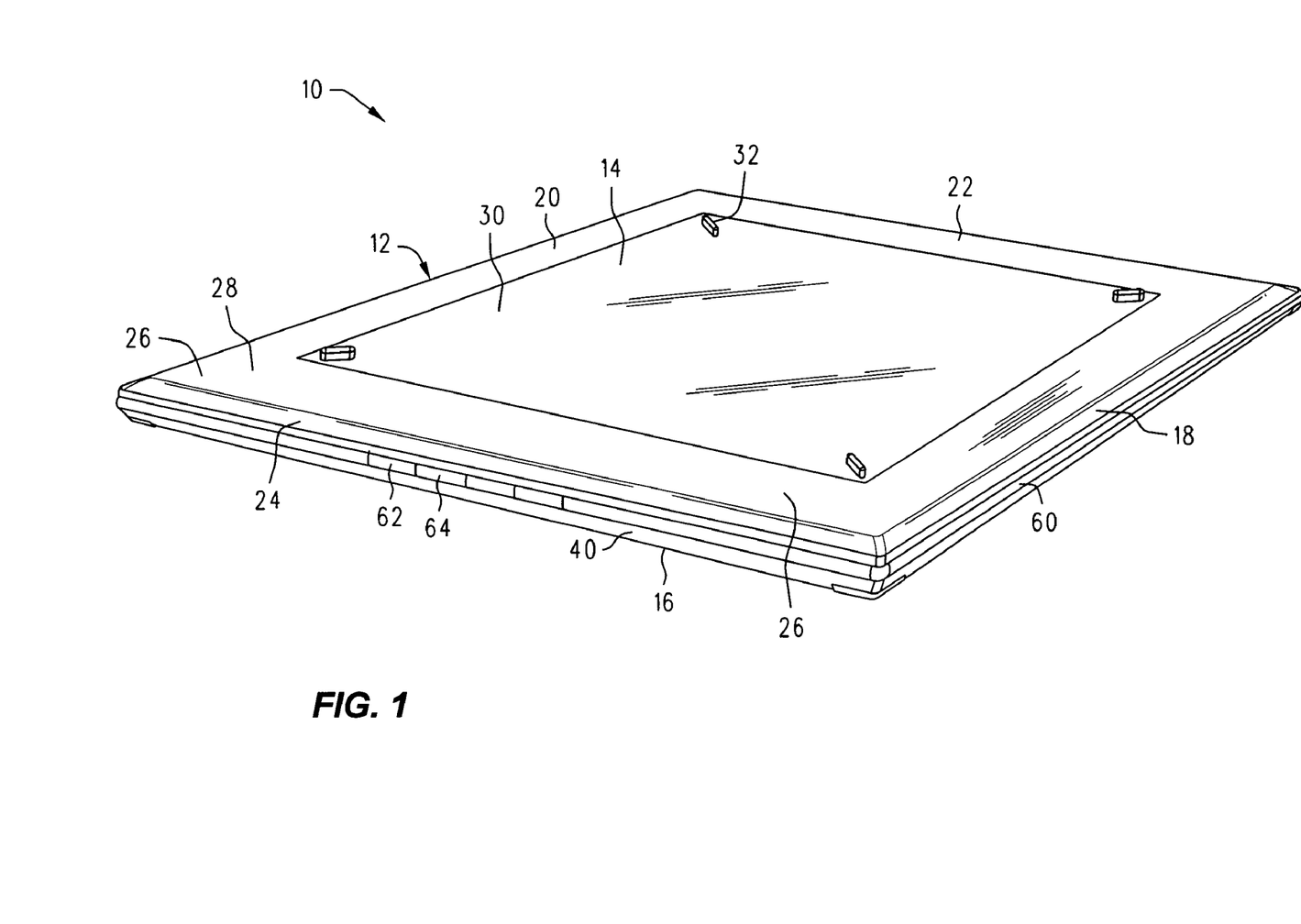
FIG. 1 is a front perspective view of an optical scanner.

FIG. 1 illustrates an optical scanner 10 having a thin rectangular housing 12. The housing has a front face portion 14, back face portion 16 (FIG. 2); a top portion 18; a bottom portion 20; a left side portion 22; and a right side portion 24. It is to be understood that the designations top, bottom, front, rear, left side and right side are arbitrary and are merely for the purpose of establishing a frame of reference for description of the scanner.

The scanner housing 12 in one embodiment comprises a front housing member 26 attached to a rear housing member 40. The front housing member 26 may comprise a opaque peripheral structure 28 having a transparent plate 30 mounted thereon with the upper surface of the opaque peripheral structure 28 and transparent plate positioned in substantially coplanar relationship. Resilient guard members 32 may be mounted at corner portions of the transparent plate 30 the resilient guard members 32 act to prevent the surface of the transparent plate 30 from coming into contact with an adjacent flat surface.

Figure 2:
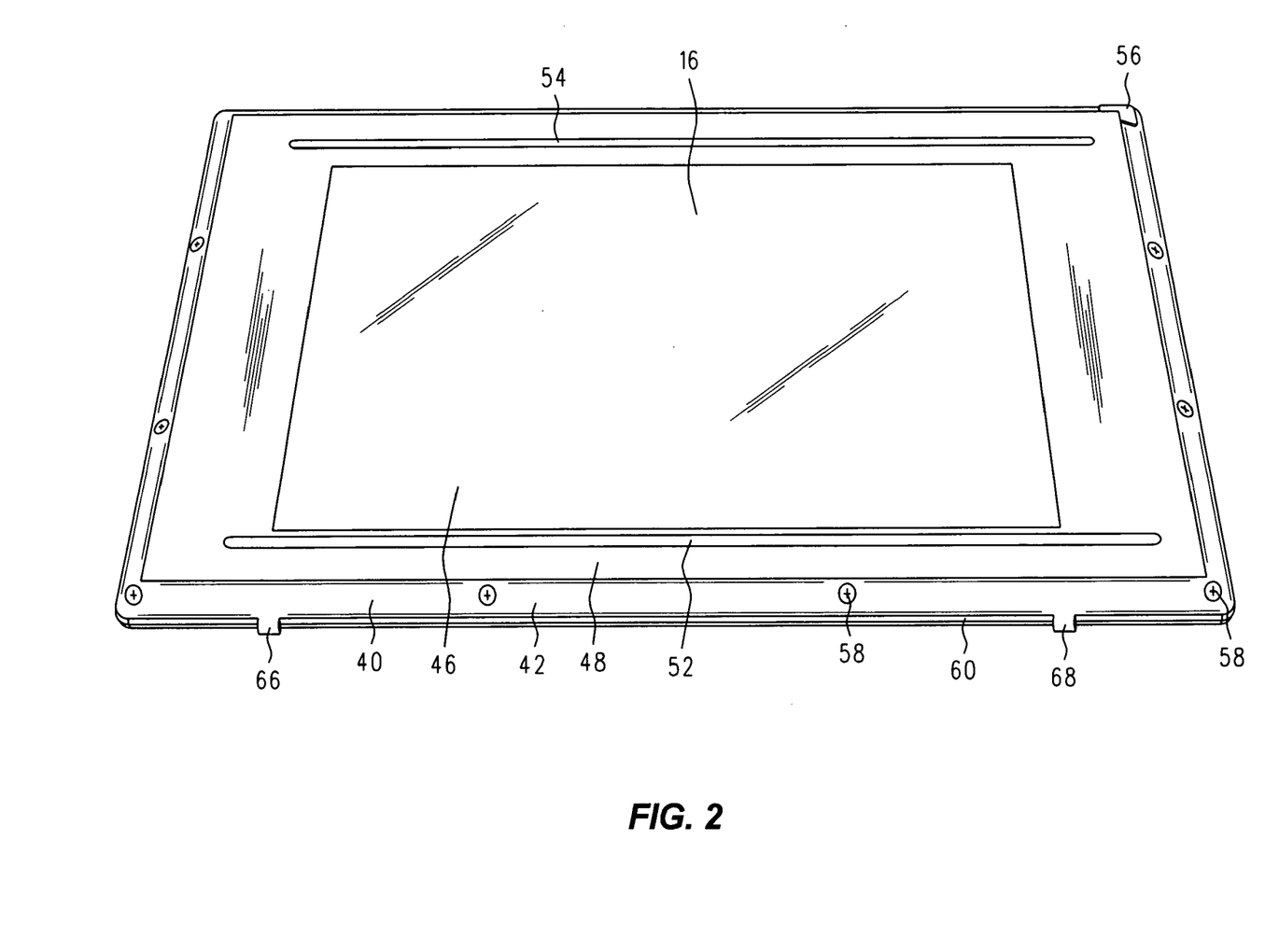
FIG. 2 is a back perspective view of the optical scanner of FIG. 1.

Rear housing member 40, FIG. 2, comprises a peripheral opaque structure 42 within which is mounted a plate member 44 in generally coplanar relationship with the adjacent surface of the peripheral structure 42. The plate member 44 comprises a rectangular transparent portion 46 aligned with the transparent plate 30 on the front housing member 26. Transparent portion 46 comprises a scanning face which is positioned in engagement or near engagement with an object, such as a document, which is to be scanned. Plate member 44 also comprises a black peripheral portion 48 which encompasses the transparent portion 46. Transparent longitudinal strips 52 54 are also defined within the opaque portion 48. The longitudinal strips extend in the direction of scanner head displacement as described in further detail below. Resilient corner guard members 56 (only one shown) extend a short distance outwardly from peripheral opaque structure 42 to help prevent abrasion of the rectangular plate member 46 when the scanner rear face is positioned against a flat object, for example when it is laid on a desk top. The front and rear housing members 26, 40 may be connected by screws, bolts, rivets, adhesive or other attachment means. In one embodiment the opposed interior peripheral edges of the front and rear housing members 26, 40 are separated by spacers e.g., tubular sleeves held in position by screws 58 extending there through. In one embodiment the gap 59, FIG. 4, formed by the spacers may be about 5 mm and may be sealed with a resilient grommet 60. Control surfaces such as push button 62, 64, etc. may be positioned in the gap 59 as illustrated in FIG. 1. Support stand registration tabs 66 may be mounted in the gap 59 and extend outwardly a short distance e.g., 3 mm from the bottom portion of the scanner housing 12.

Figure 3:
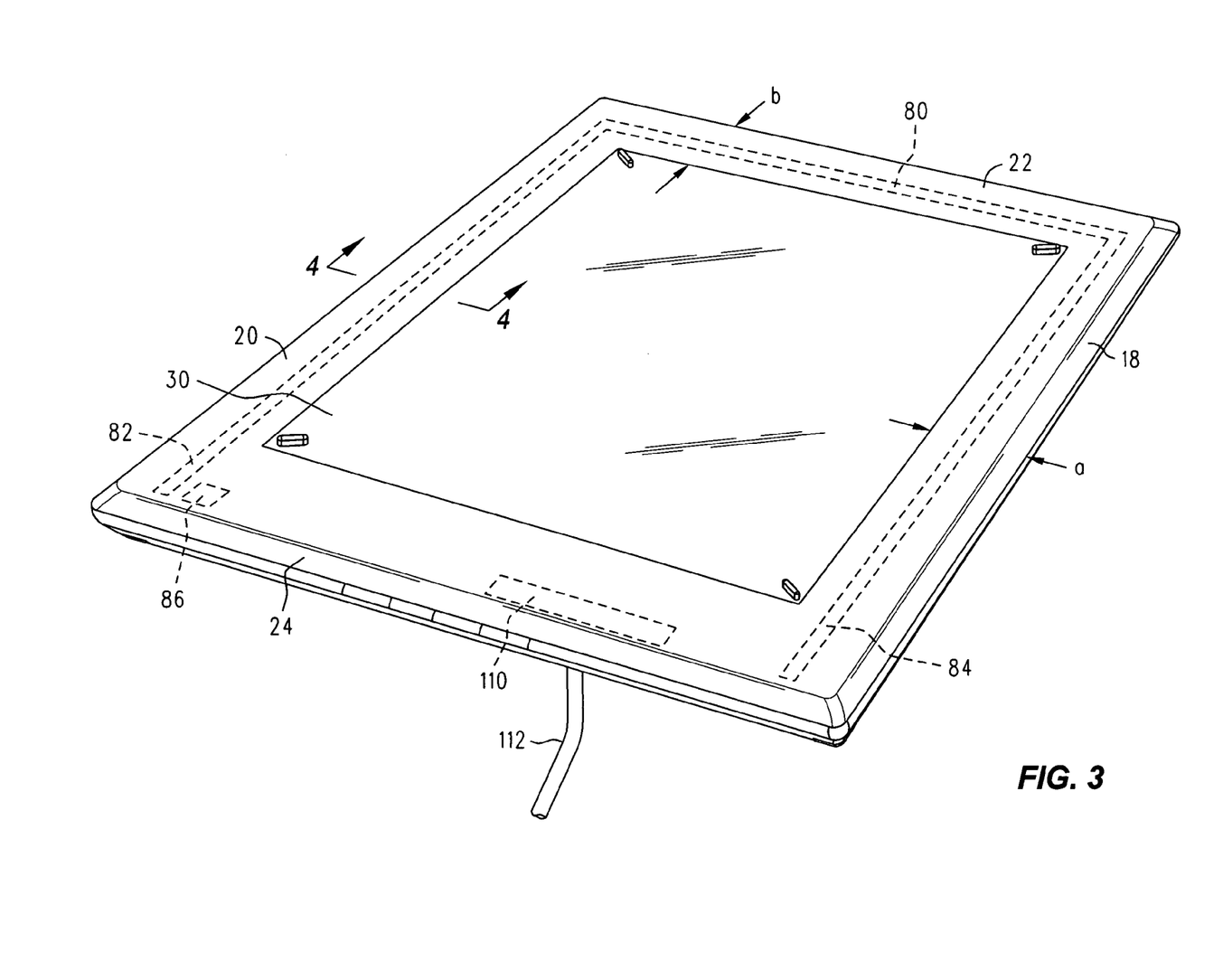
FIG. 3 is a front perspective view of the optical scanner of FIG. 1 showing certain internal structure thereof in hidden lines.
Figure 4:
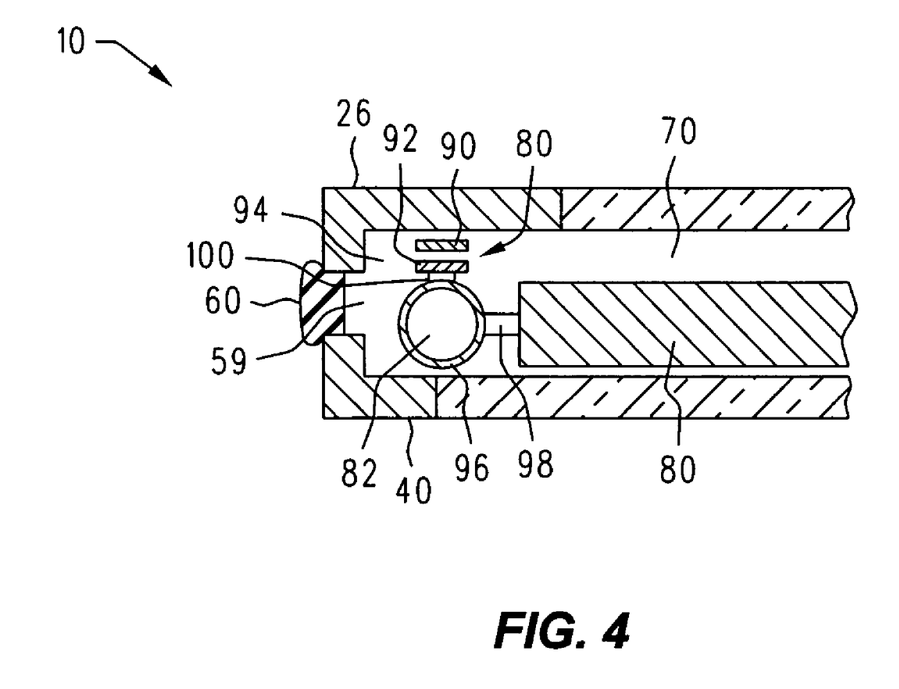
FIG. 4 is a schematic cross sectional view of the optical scanner of FIG. 1.

As illustrated by FIGS. 3 and 4, a displaceable scanning head 80 is position within the enclosure 70 defined by the housing front and rear members 26, 40. Scanning head 80 may comprise a contact image sensor assembly or other type sensor assembly capable of being provided in a small thickness configuration. The displaceable scanning head also comprises an illumination source such as LED's, one or more flourescent bulbs, or other illumination means. Scanning head 80 extends from the top portion 18 to the bottom portion 20 of the scanner terminating near the transparent strips 52,54. The scanning head 80 is displaceably supported on support rails 82,84 which extend in the direction of scanning movement. A sleeve 96 (only one shown) is slidingly mounted on each rail 82 84 and is attached by a connection member 98 to scanning head 80. One or more electric drive motors 86 are also mounted within the housing enclosure 70 at a lateral end of the enclosure. In one embodiment there is only one drive motor 86 having a single endless belt 88 connected. The belt extends in alignment with one of the drive rails e.g., 82. The drive belt 88 may be connected to a drive pulley (not shown) on the motor 86 and may be connected to an idler pulley near the end of support shaft 82 opposite to the end where the motor 86 is located. The belt 88 comprises a first portion 90 and a second portion 92. In one embodiment the first and second portions of the belt 90, 92 and the shaft 82 are positioned in front to rear alignment in the space 94 between opposite opaque portions of the front and rear housing member 26, 40. The sleeve 96 is connected to the adjacent belt portion 92 by any appropriate connector such as a clip, strap, rivet, adhesive or other connector. Rotational displacement of the drive motor 86 causes linear displacement of the portions 90, 92 of the endless belt which in turn causes linear displacement of the sleeve 96 and attached scanning head 80.

Prior to a scanning operation the displaceable scanning head 80 is parked at a location at one lateral end e.g., end portion 22 of the housing below the opaque portion thereof. During a scanning operation the displaceable scanning head 80 moves in a path defined by support rails 82, 84, passing between the front transparent plate 30 and the rear transparent plate portion 46. At the end of the scanning operation the scanning head returns to its parked position between opaque portions of the front and rear housing members 26, 40 at end 22. In a alternative embodiment rather than having a single motor 86, two drive motors could be provided, one associated with each guide rail 82, 84. In this alternative embodiment the motors may be locked in a phase locked loop to provide synchronous operation. In another embodiment a single drive motor 82 rotates a drive shaft (not shown) having a drive pulley mounted in association with each of the support rails 82 84 and a separate endless build 88 is operably connected to these drive pulleys and also to the separate support sleeves to which the scanning head is connected.

In further alternative embodiments the endless belt is positioned between the scanning head 80 and shaft 82 and only one guide shaft 82 is used. The side of the scan head located opposite the shaft 82 is supported by spring wheels (not shown) which engage the interior glass panel surfaces of both the front and rear housing members 26, 40.

Various electronic components and interfaces 110 may be mounted at one end portion, e.g., 24 of the housing and connected to the scanning head as by electrical cables (not shown). An exterior cable 112 connected to the electronic components 110 may in turn be connected to a scanner input receiving device such as a computer or printer (not shown). The cable 112 may be a power cable such as a Firewire connector, a universal serial bus connector or any other appropriate type of electrical connector in current use or developed in the future. In an alternative embodiment a transmitter is provided either in electronic components 110 or directly on the scanning head 80 which transmits data signals wirelessly to a receiver in a computer, scanner, etc. Power to the unit may be provided from an external power source as through cable 112 or other power cable or alternatively may be provided by batteries or other onboard power source.

Figure 5:
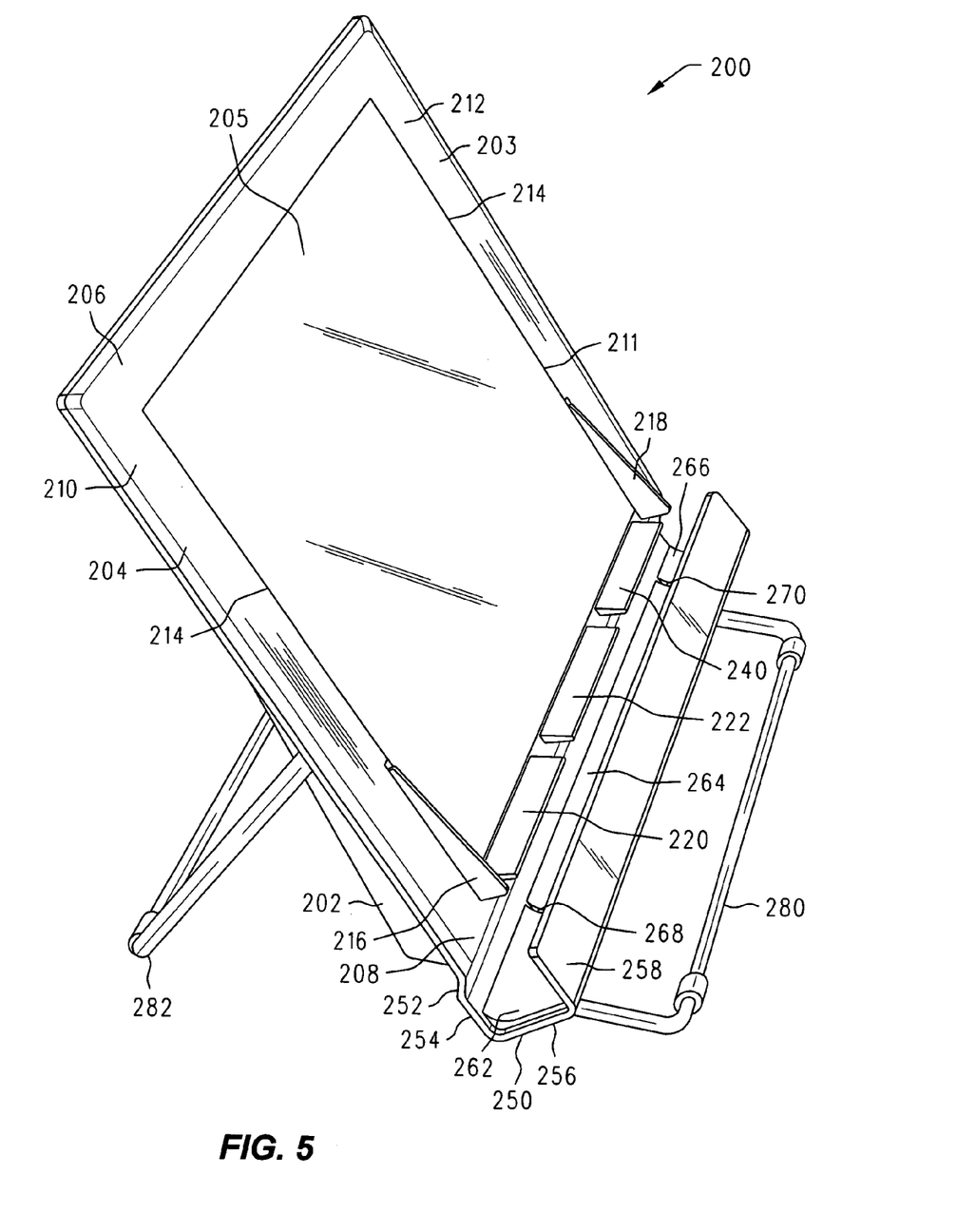
FIG. 5 is a front perspective view of an optical scanner support stand.

A scanner support stand 200 is illustrated in FIG. 5. The support stand comprises a generally J-shaped support member 202 and a pair of U-shaped leg members 280 282. The J-shaped support member 202 has a generally flat upper front face portion 204 comprising a flat panel 205 encompassed by an opaque peripheral portion 203. In the illustrated embodiment panel 205 is transparent, but in other embodiments it is translucent or opaque. The opaque portion 203 comprises a top portion 206 bottom portion 208, left side portion 210 and right side portion 212. Deflectable sheet registration members 216, 218 may be position at a lower end of the upper front face portion 204 in alignment with the vertical edges 214 of the transparent panel 205. Deflectable sheet support members 220, 222, 240 are positioned at a bottom edge of transparent panel 205. Each of the deflectable members 216, 218, 220, 222, 240 is outwardly biased to the position shown in FIG. 5 as by one or more springs (not shown) or other biasing means. In one embodiment each of the deflectable members 216, 218, 220, 222, 240 is a portion of a unitary structure such that deflection of any member causes deflection of all other members. Each of the deflectable members may be urged into a position in flush relationship with the planar surface of transparent panel 205.

The generally J-shaped support member 202 comprises a hooked shaped bottom portion 250. The hooked shaped portion 250 comprises a rearwardly and downwardly inclined wall portion 252 which may be about 10 millimeters long and may be inclined at about 45 degrees with respect to the surface of plate member 205. The hooked shaped portion 250 also includes a vertical wall portion 254 aligned parallel to plate 205 which may have a dimension of approximately 23 millimeters. Attached to vertical wall portion 254 is a horizontal wall portion 256 which may have a dimension of approximately 35 millimeters. A second vertical wall portion 258 is connected to an end portion of horizontal wall portion 256. The second vertical wall portion may have a dimension of approximately 255 millimeters. A support pad member 262 which may have a thickness of approximately 3 millimeters and an increased thickness, arculate portion located adjacent to wall 254 is mounted on the horizontal wall portion 256. Support pad members 264, 266 of identical cross section to support pad member 262 are also positioned along horizontal wall 256 and are spaced apart by small gaps 268, 270 of slightly greater width than the width of scanner registration tabs 66, 68. The width and the depth of the gaps are such that when the scanner tabs are received therein the optical scanner 10 is prevented from moving left or right but may pivot forward and backward.

Figure 6:
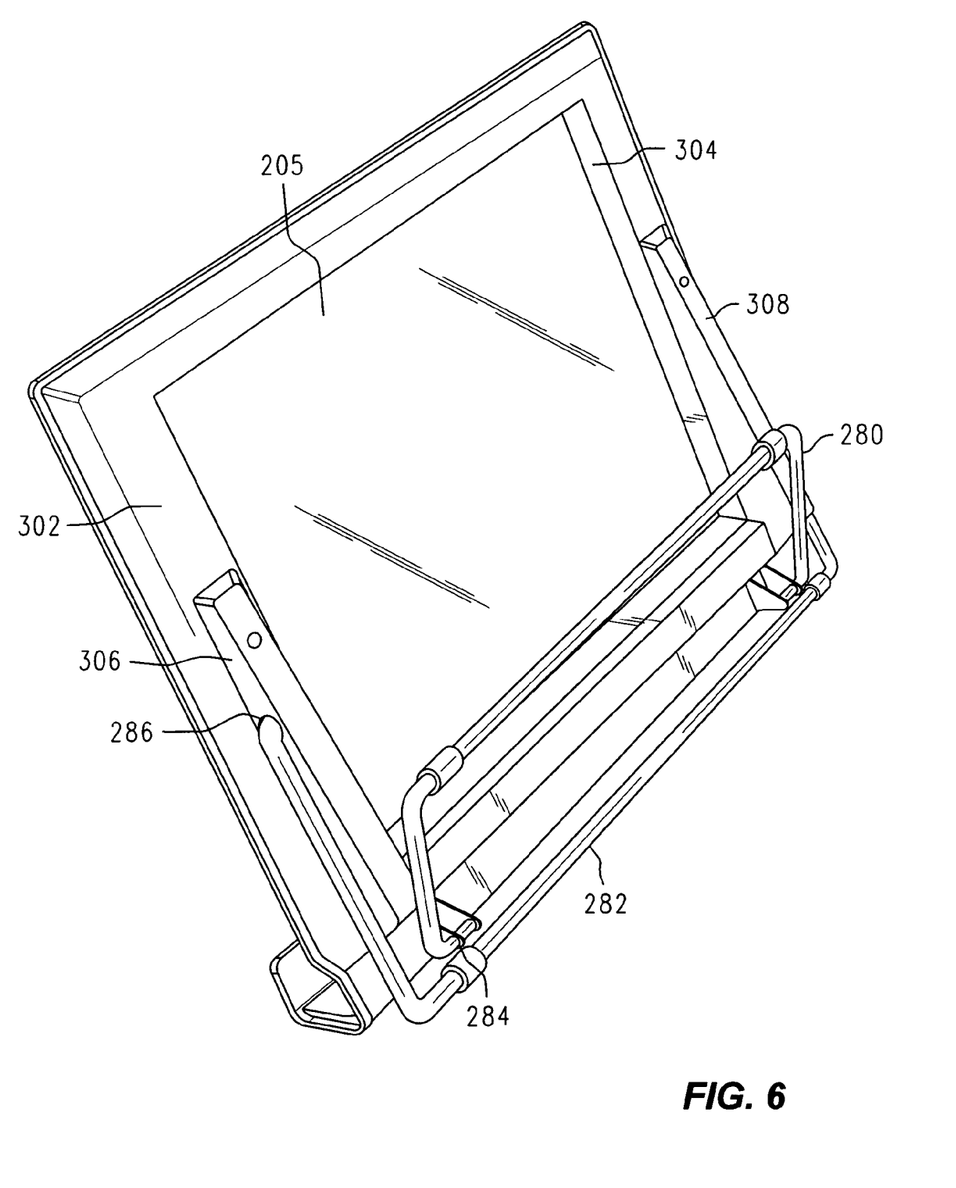
FIG. 6 is a back perspective view of the optical scanner support stand of FIG. 5.

The U-shaped leg members 280, 282 are mounted in a manner to allow pivotal movement between an erect positioned as illustrated in FIG. 5 and a folded position as illustrated in FIG. 6, as by mounting holes 282, 284, 286, etc. and appropriate internal stop structures.

A rear portion 292 of the J-shaped support member 202 is illustrated in FIG. 6 the rear portion includes a rear surface of panel 205. The panel 205 is recessed from an opaque flat peripheral portion 302 by a transverse recessed wall 304. The raised wall portions 306, 308 may be provided on flat peripheral portion 302 to facilitate mounting of U-shaped leg member 280 thereon. In one embodiment the leg members 280,282 are adapted to be folded into a relatively flat compact relationship with the generally J-shaped member 202 as illustrated in FIG. 6.

Figure 7:
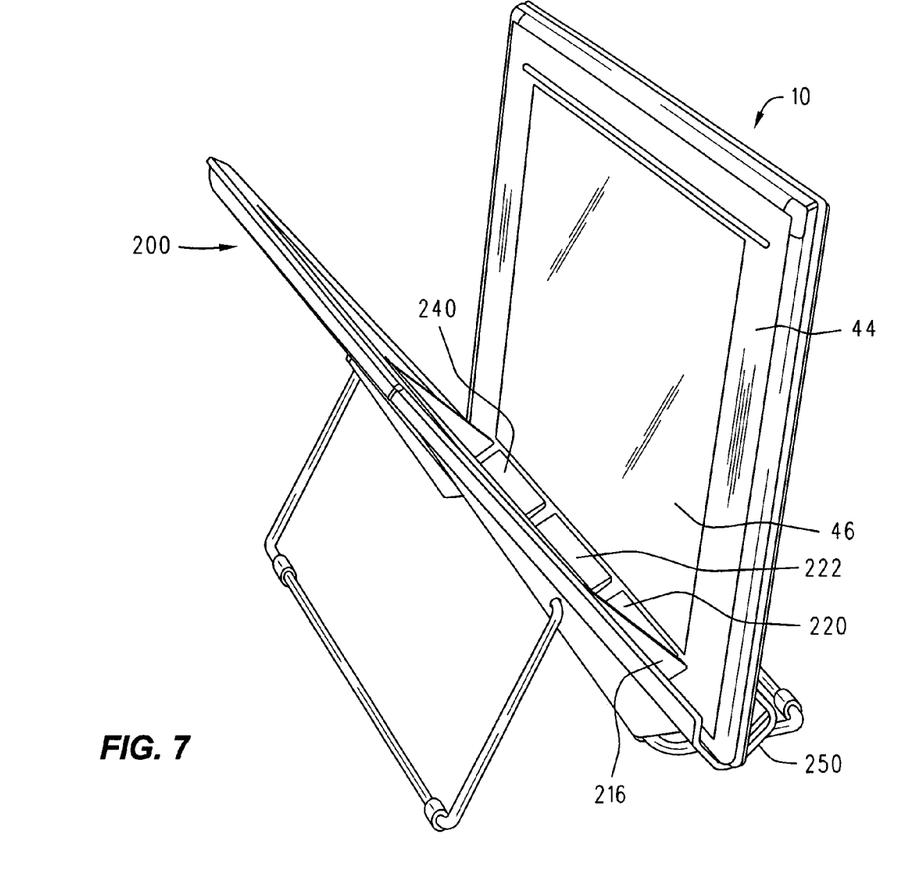
FIG. 7 is a left rear perspective view of an optical scanner assembly.

As illustrated in FIG. 7 the hooked shaped bottom portion 250 and the support pad members 262, 264, 266 (FIG. 5) are adapted to receive the optical scanner 10 in fixed registered relationship with support stand 200 with respect to left or right movement and in pivotable relationship with stand 200 with respect to forward and rearward movement. The tabs 66, 68 of the scanner are located in gaps 268, 270 and the bottom terminal edge portion of the scanner 10 rests on the surface of pads 262, 264, 266.

Figure 8:
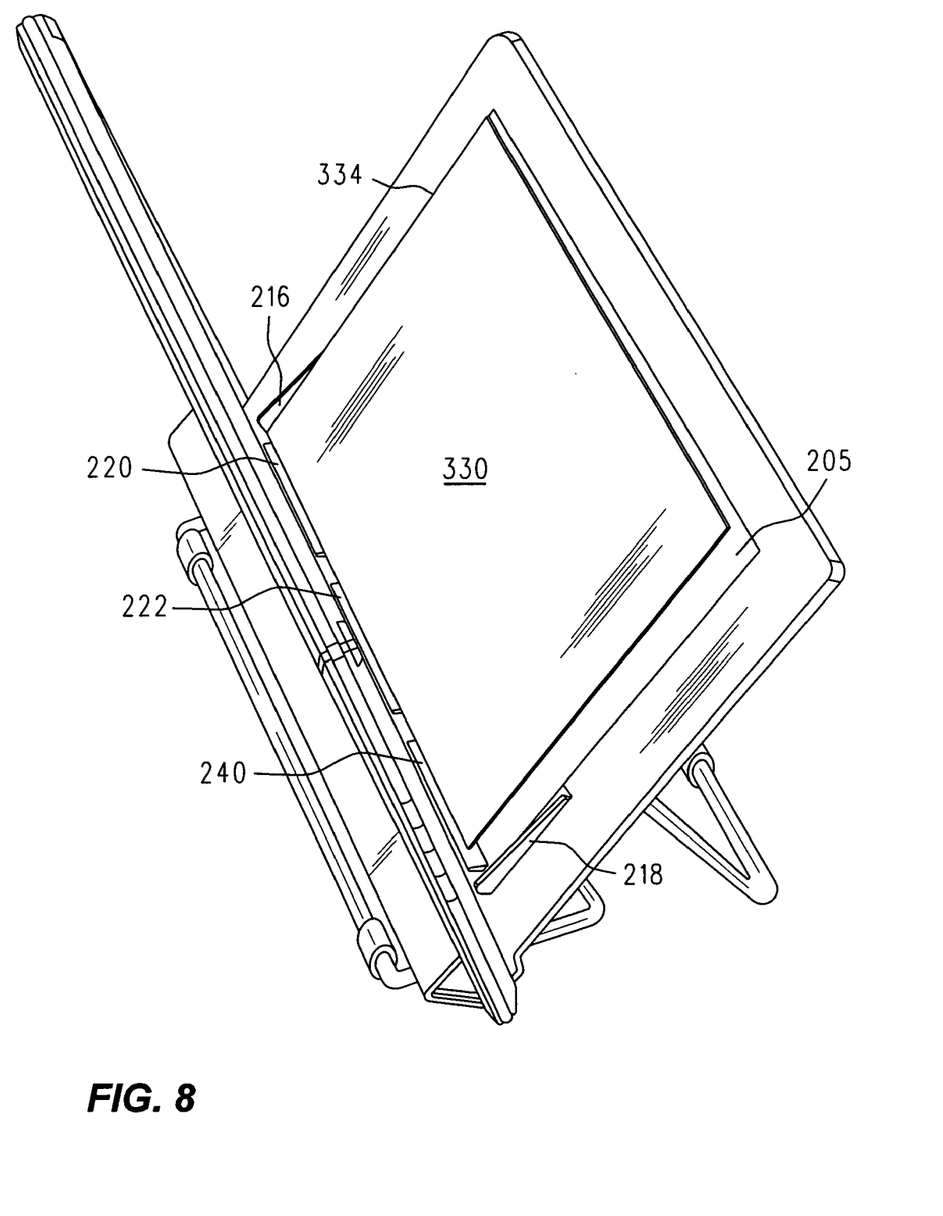
FIG. 8 is a right front perspective view of an optical scanner assembly having a document positioned therein.

In the operating position illustrated in FIG. 7 the scanner is in a pivoted forward position in which it engages the vertical wall portion 258 of the hooked-shaped bottom portion 250 of the support stand 200. The thickness of the optical scanner 10 and the construction of lower-hooked shaped member 250 are such that the rear face plate 46 of the scanner is engaged by terminal edge surfaces of horizontal deflectable support members 220, 222, 240 such that there is no gap between the horizontal deflectable members and the scanner rear plate portion 46. The deflectable sheet registration members 216, 218 also contact the plate member 46. Thus, as illustrated in FIG. 8, a document 330 may be supported at its lower edge 332 by deflectable sheet support members 220, 222, 240 with a vertical edge 334 of the document in registration with the deflectable sheet registration number 216. A rear face portion of the document 330 is supported against the front surface of support stand plate member 205. The engagement of support members 220, 222, 240 with the optical scanner 10 prevent documents which are to be scanned from moving out of proper registration with the scanner 10 as by sliding vertically downwardly along the face of the scanner 10 or the opposing face of the support stand 200.

Figure 9:
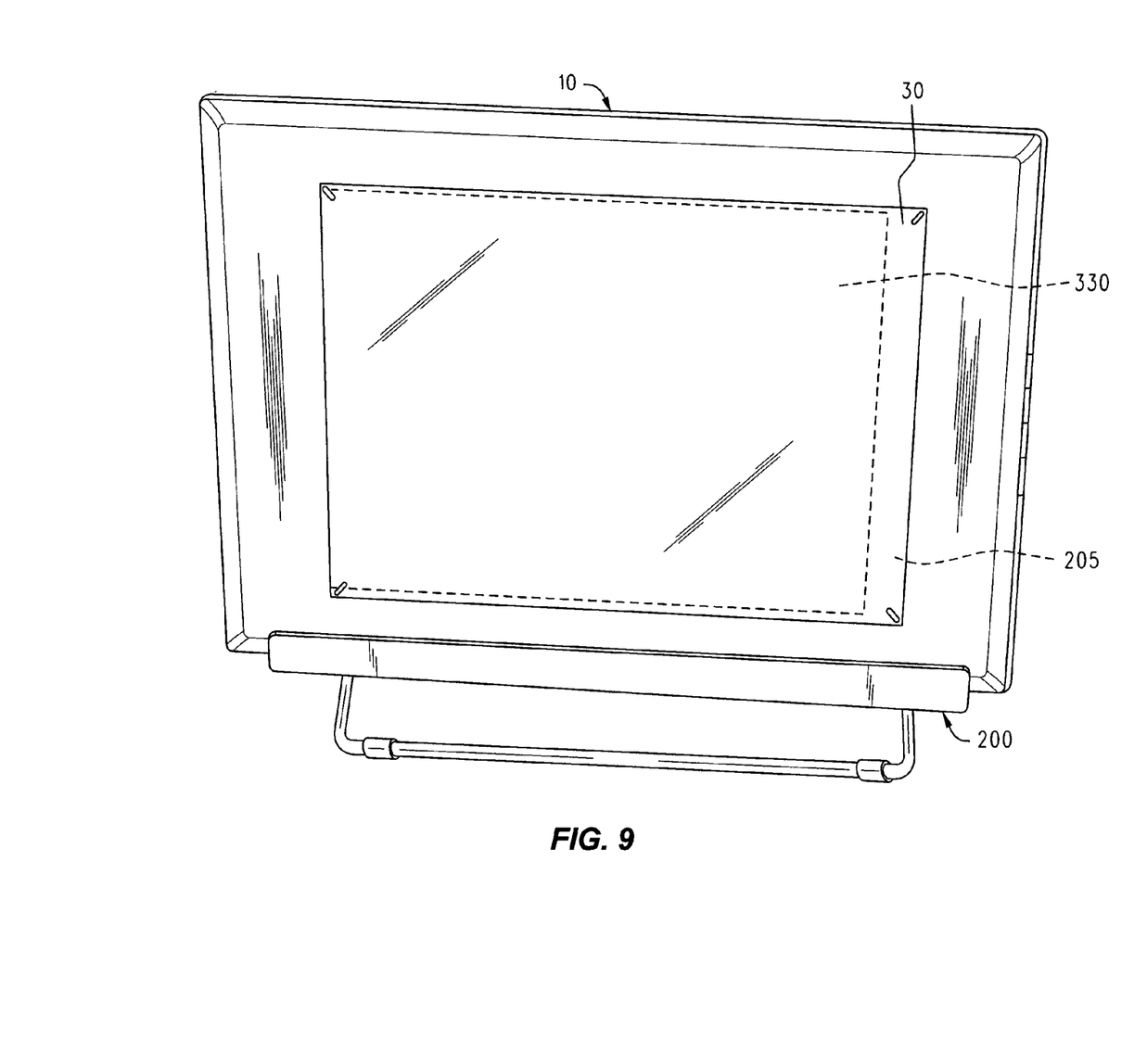
FIG. 9 is a front perspective view of an optical scanner assembly having a document to be scanned positioned therein and with the scanner in scanning position.
Figure 10:
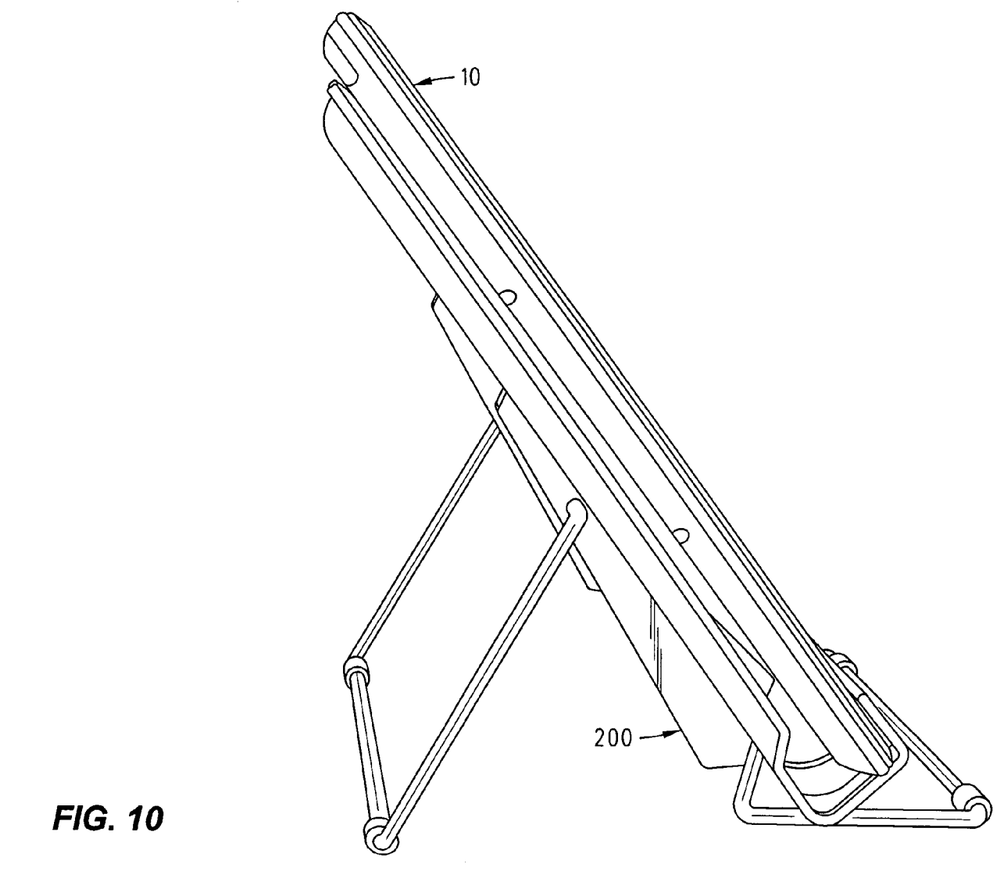
FIG. 10 is a left side perspective view of the optical scanner assembly with the optical scanner in the scanning position illustrated in FIG. 9.

FIG. 9 is a front view of the optical scanner 10 mounted on the support stand 200 with the scanner 10 pivoted rearwardly such that document 330 is disposed in close "sandwiched" relationship between the transparent plate portion 205 of the support stand and the transparent plate 30 of the optical scanner 10. In this position the faces of the document, the transparent plates 30 and 46 of the optical scanner and the transparent plate 205 of the support stand 200 are all positioned in substantially parallel relationship. This parallel relationship is further illustrated in FIG. 10 which is a left side elevation view of the optical scanner 10 supported in a scanning position in the support stand 200. In this position the scanner 10 may be actuated to scan the document 330. The two transparent faces of the scanner 10 facilitate placement of document 330 in relationship to the scanning face 46 of the scanner 10.

Figure 11:
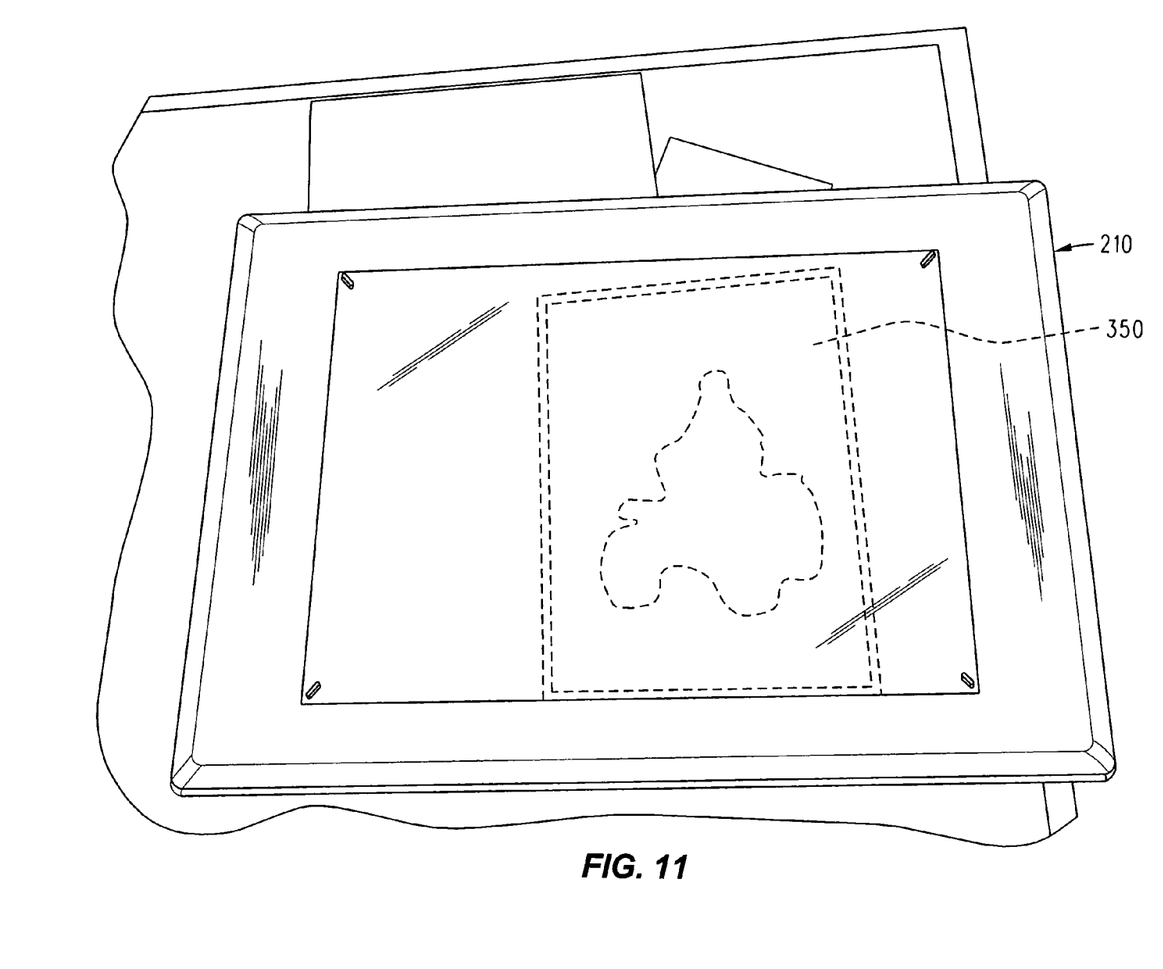
FIG. 11 is a front perspective view illustrating use of the optical scanner of FIGS. 1 through 4 to perform scanning of a vertical surface.
Figure 12:
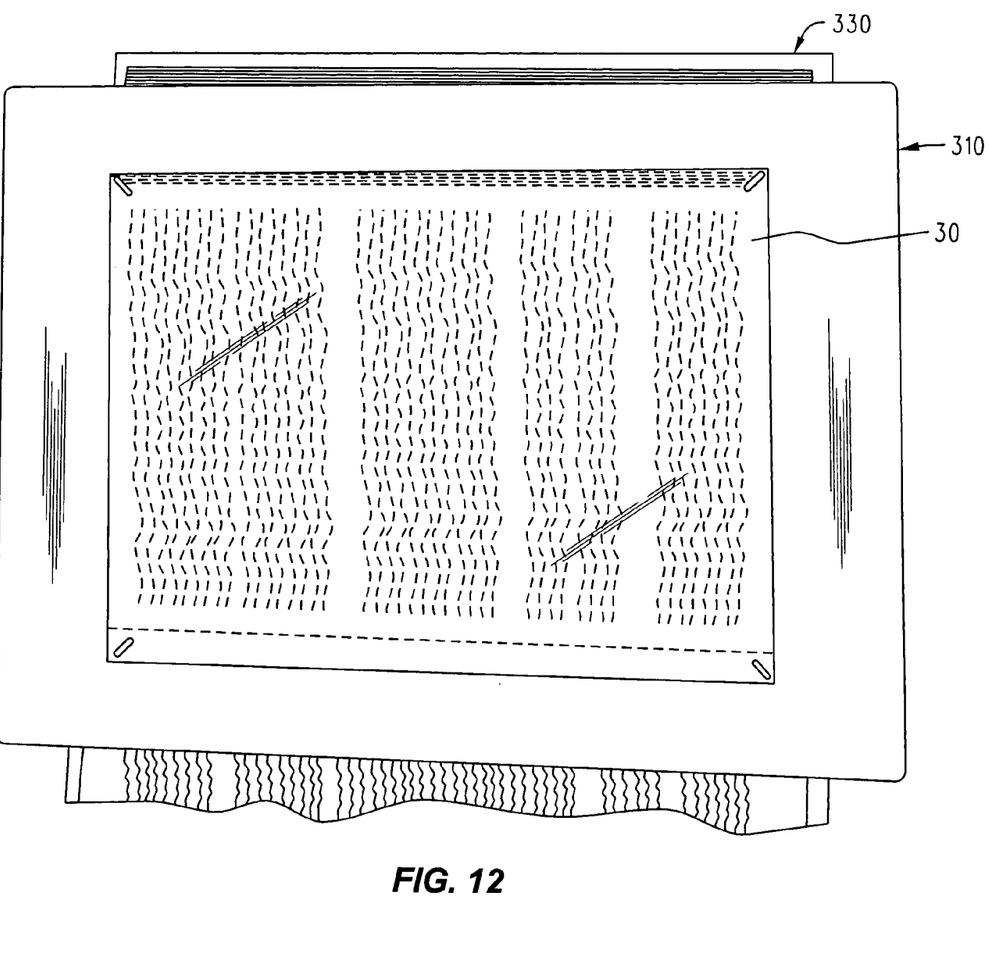
FIG. 12 is a front perspective view illustrating use of the optical scanner of FIGS. 1 through 4 to scan the page of a book.

FIG. 11 is a perspective view illustrating the use of the optical scanner 10 to scan a vertically oriented object. It may be seen that the transparent front and rear panels of the optical scanner facilitate placing the object to be scanned 350, in this case a picture fastened to a vertical bulletin board, for proper scanning. Thus the scanner may be used without the scanning stand 200 in order to scan objects which may not be conveniently placed between the scanner 10 and the support stand 200. FIG. 12 illustrated another such scanning operating in which a thick dictionary 360 is scanned by pressing the scanner 10 against the dictionary and aligning it through the transparent portions 30 46 of the scanner.

What is claimed is:

1. A scanning assembly for scanning an object, said scanning assembly comprising:
   a support structure having a support surface thereon capable of supporting said object;
   an optical scanner movably supported by said support structure;
   wherein said scanning assembly is moveable between at least an open condition and a closed condition;
   wherein, in said open condition;
      said optical scanner is not substantially parallel to said support surface;
      said optical scanner is at least partially supported by said support structure; and
      said optical scanner is located on a first side of a vertical plane;
   wherein, in said closed condition:
      said optical scanner is substantially parallel to said support surface;
      said optical scanner is at least partially supported by said support structure; and
      said optical scanner is located on a second side of said vertical plane, said second side being opposite said first side.

2. The scanning assembly of claim 1 and further wherein said support structure comprises at least one guide member.

3. The scanning assembly of claim 2 and further wherein said guide member is moveable between:
   a recessed position in which at least a portion of said guide member is recessed within said support structure; and
   an extended position in which said at least a portion of said guide member is not recessed within said support structure.

4. The scanning assembly of claim 3 and further wherein; when said scanning assembly is in said closed condition, said guide member is in said recessed position.

5. The scanning assembly of claim 4 and further wherein: when said scanning assembly is in said open condition, said guide member is in said extended position.

6. The scanning assembly of claim 1 and further comprising:
   at least one first leg member movably attached to said support structure, said first leg member being pivotal between a refracted position and an extended condition relative to said support structure.

7. A method of scanning an object comprising:
   providing a scanning assembly comprising a support structure having a support surface thereon capable of supporting said object and an optical scanner movably supported by said support structure;
   placing said scanning assembly in an open condition in which said optical scanner is not substantially parallel to said support surface and said optical scanner is at least partially supported by said support structure;
   using the force of gravity to maintain said scanning assembly in said open condition;
   placing said object on said support surface;
   while maintaining supporting contact between said support structure and said optical scanner, moving said scanning assembly to a closed condition in which said optical scanner is substantially parallel to said support surface;

using the force of gravity to maintain said scanning assembly in said closed condition; and scanning said object with said optical scanner.

8. The method of claim 7 and further comprising:

locating said support structure on a substantially horizontal surface before said placing said scanning assembly in an open condition;

wherein, in said open said optical scanner is located on a first side of a vertical plane; and wherein, in said closed condition, said optical scanner is located on a second side of said vertical plane, said second side being opposite said first side.

9. The method of claim 8 and further wherein said support surface is located on said second side of said vertical plane in both said open condition and said closed condition.

10. The method of claim 7 and further wherein:

said support structure comprises at least one guide member;

said placing said object on said support surface comprises contacting said object with said guide member.

11. The method of claim 10 and further wherein said guide member is moveable between:

a recessed position in which at least a portion of said guide member is recessed within said support structure; and an extended position in which said at least a portion of said guide member is not recessed within said support structure.

12. The method of claim 11 and further comprising:

moving said guide member to said recessed position while moving said scanning assembly to said closed condition.

13. The method of claim 7 and further comprising:

removing said optical scanner from said support structure; and, thereafter using said optical scanner to scan a second object that is not located on said support surface.

14. The method of claim 8 and further wherein:

said scanning assembly further comprises at least one first leg member movably attached to said support structure, said first leg member being pivotal between a retracted position and an extended condition relative to said support structure; and said locating said support structure on a substantially horizontal surface comprises pivoting said first leg member to said extended condition and contacting at least a portion of said first leg member with said horizontal surface.

15. The method of claim 8 and further wherein:

said support surface comprises a translucent portion.

16. The method of claim 15 and further wherein said translucent portion is transparent.

17. A scanning assembly for scanning an object, said scanning assembly comprising:

a support structure having a support surface thereon capable of supporting said object;

an optical scanner movably supported by said support structure;

wherein, said support structure comprises a translucent portion;

wherein said support structure further comprises at least one guide member moveable between:

an at least partially recessed position in which at least a portion of said guide member is recessed within said support structure; and an extended position in which said at least a portion of said guide member is not recessed within said support structure.

18. The scanning assembly of claim 17 and further wherein said translucent portion is transparent.

* * * * *

UNITED STATES PATENT AND TRADEMARK OFFICE
CERTIFICATE OF CORRECTION

| | | |
|---|---|---|
| PATENT NO. | : 7,051,942 B2 | Page 1 of 1 |
| APPLICATION NO. | : 10/819805 | |
| DATED | : May 30, 2006 | |
| INVENTOR(S) | : Modest Khovaylo | |

It is certified that error appears in the above-identified patent and that said Letters Patent is hereby corrected as shown below:

In column 6, line 52, in Claim 6, delete "refracted" and insert -- retracted --, therefor.

Signed and Sealed this

Twelfth Day of May, 2009

JOHN DOLL
*Acting Director of the United States Patent and Trademark Office*